US009329839B2

(12) United States Patent
Delancy, Jr. et al.

(10) Patent No.: US 9,329,839 B2
(45) Date of Patent: May 3, 2016

(54) MULTI-VIEW FORM DESIGN (75) Inventors: Michael Gary Delancy, Jr., Olathe, KS (US); Patrick Sean Delancy, Gardner, KS (US)

(73) Assignee: Data Systems International, Inc., Overland Park, KS (US)

( * ) Notice: Subject to any disclaimer, the term of this patent is extended or adjusted under 35 U.S.C. 154(b) by 440 days.

(21) Appl. No.: 13/084,315

(22) Filed: Apr. 11, 2011

(65) Prior Publication Data
US 2012/0260200 A1 Oct. 11, 2012

(51) Int. Cl.
*G06F 9/44* (2006.01)
(52) U.S. Cl.
CPC ........................................ *G06F 8/34* (2013.01)
(58) Field of Classification Search
CPC .......................................................... G06F 8/34
USPC ................................................. 715/223, 762
See application file for complete search history.

(56) References Cited

U.S. PATENT DOCUMENTS

| | | | |
|---|---|---|---|
| 5,579,509 A | 11/1996 | Furtney et al. | |
| 6,023,714 A * | 2/2000 | Hill et al. ....................... | 715/235 |
| 7,178,141 B2 | 2/2007 | Piazza | |
| 7,802,186 B2 * | 9/2010 | Burke et al. ................... | 715/709 |
| 7,917,858 B2 * | 3/2011 | Pereira et al. ................. | 715/762 |
| 8,671,352 B1 * | 3/2014 | Hsu et al. ...................... | 715/762 |
| 8,745,228 B2 | 6/2014 | Beckert et al. | |
| 2002/0194219 A1 * | 12/2002 | Bradley et al. ................ | 707/506 |
| 2003/0137539 A1 * | 7/2003 | Dees ............................. | 345/762 |
| 2004/0015893 A1 * | 1/2004 | Banavar et al. ............... | 717/138 |
| 2004/0039990 A1 * | 2/2004 | Bakar et al. ................... | 715/505 |
| 2004/0153965 A1 * | 8/2004 | O'Rourke ..................... | 715/505 |
| 2004/0223009 A1 * | 11/2004 | Szladovics ............ G06F 9/4443 | 715/760 |
| 2005/0060408 A1 * | 3/2005 | McIntyre et al. ............. | 709/225 |
| 2005/0060648 A1 | 3/2005 | Fennelly et al. | |
| 2005/0066037 A1 * | 3/2005 | Song et al. .................... | 709/227 |
| 2005/0071803 A1 * | 3/2005 | Cherdron et al. ............. | 717/101 |
| 2005/0138571 A1 | 6/2005 | Keskar et al. | |
| 2005/0183006 A1 * | 8/2005 | Rivers-Moore et al. ...... | 715/513 |
| 2006/0174195 A1 * | 8/2006 | White ........................... | 715/522 |
| 2007/0044041 A1 | 2/2007 | Beynon et al. | |
| 2007/0061710 A1 * | 3/2007 | Chartier et al. ............... | 715/523 |
| 2007/0157185 A1 * | 7/2007 | Semerdzhiev et al. ....... | 717/148 |
| 2007/0288858 A1 * | 12/2007 | Pereira et al. ................. | 715/764 |
| 2008/0222514 A1 * | 9/2008 | Rivers-Moore et al. ...... | 715/235 |
| 2009/0158134 A1 * | 6/2009 | Wang et al. ................... | 715/222 |
| 2009/0249296 A1 * | 10/2009 | Haenel et al. ................. | 717/120 |
| 2010/0287528 A1 * | 11/2010 | Lochmann .................... | 717/104 |
| 2011/0023016 A1 * | 1/2011 | Khader et al. ................ | 717/120 |
| 2011/0035655 A1 * | 2/2011 | Heineken ...................... | 715/223 |
| 2011/0154287 A1 * | 6/2011 | Mukkamala et al. ......... | 717/105 |
| 2011/0179377 A1 * | 7/2011 | Fleming ........................ | 715/779 |
| 2012/0090021 A1 * | 4/2012 | Luh et al. ........................ | 726/17 |
| 2012/0166974 A1 * | 6/2012 | Elford et al. .................. | 715/760 |

OTHER PUBLICATIONS

Oracle Universal Content Management Web Form Editor 10g Release 3 (10.1.3.3.2) Sep. 2007 104 pages.*
Aun Microsoft Word 2010: View Two Documents Side by Side Jan. 15, 2010 5 pages.*
Linda Johnson Save? Save As? Save as What? Jun. 16, 2002 2 pages.*
Non-Final Office Action mailed Jul. 3, 2012 in U.S. Appl. No. 13/084,301, 12 pages.
Final Office Action mailed Dec. 4, 2012 in U.S. Appl. No. 13/084,301, 14 pages.
Non-Final Office Action dated Jan. 15, 2015 in U.S. Appl. No. 13/084,301, 15 pages.
WAP forum, Wireless Application Group User Agent Profile Specification, Nov. 10, 1999, WAP forum, pp. 1-76.
Final Office Action dated Sep. 2, 2015 in U.S. Appl. No. 13/084,301, 15 pages.

\* cited by examiner

*Primary Examiner* — Andrea Long
(74) *Attorney, Agent, or Firm* — Shook, Hardy & Bacon L.L.P.

(57) ABSTRACT

Methods, computer systems and computer readable media for receiving designing and displaying device and platform-specific forms are provided. In embodiments, base forms are utilized and modified to create custom forms that are platform and device specific, without breaking the parent-child relationship between the base form and the custom form for any non-modified characteristics of the base form. Custom forms enhance the performance and appearance. In embodiments, interrogators are executed at runtime to specify a set of instructions that will be executed, further enhancing the performance and appearance associated with the form and the particular device displaying the form. In various embodiments of the present invention, user interfaces provide the designer visual representations of the forms as they appear on selected platforms and/or devices.

16 Claims, 12 Drawing Sheets

MULTI-VIEW FORM DESIGN

CROSS REFERENCE TO RELATED APPLICATIONS

This application is related to commonly assigned U.S. patent application entitled "Multi-view Runtime Interrogator" Ser. No 13/084,301 filed concurrently herewith on the same date.

BACKGROUND

Business applications (e.g., forms) are often written to run on mobile devices. This requires the application to run on multiple platforms. In some instances, the same application is written multiple times utilizing platform-specific tools. This can be extremely time consuming and is often impractical due to a lack of appropriate skill sets. In other instances, a scripting language, such as HyperText Markup Language (HTML), is utilized to provide a one-size-fits-all solution that can run on all platforms. However, this solution is also limited to the capabilities of a particular device or platform. The look and feel of an application is often very proprietary in nature, and maintaining that look and feel with a scripting language alone is nearly impossible. Another option is to utilize a multi-platform tool to develop an application that can run on all platforms without duplication of effort. However, even this solution cannot solve the look and feel problem. Screen elements and attributes, such as size, are limited to the "least common denominator" (i.e., the device with the most limitations, or the least capabilities, for an attribute such as size).

SUMMARY

Embodiments of the present invention relate to systems, methods, and computer storage media for designing and displaying applications for multiple platforms and devices. In one embodiment, one or more computer storage media storing computer-executable instructions that, when executed by one or more computing devices, cause the one or more computing devices to perform a method for designing a platform-specific form. The method includes receiving, on a device, instructions for displaying a custom form. The device is scanned with an interrogator to identify hardware characteristics. Similarly, the device is scanned with the interrogator to identify other characteristics. At least a portion of the instructions are executed based on the hardware and other characteristics identified by the interrogator. The custom form is displayed based on the at least a portion of the instructions that are executed.

In another embodiment, one or more computer storage media storing computer-executable instructions that, when executed by one or more computing devices, cause the one or more computing devices to perform a method for designing a platform-specific form. The method includes transmitting instructions to a device for displaying a custom form. A first portion of the instructions are executed to scan a device for characteristics. A second portion of the instructions are executed based on the characteristics. The custom form is presented to the device based on the second portion of the instructions that are executed.

In yet another embodiment, a computer system for displaying a custom form on a device comprises a processor coupled to a computer storage medium, the computer storage medium having stored thereon a plurality of computer software components executable by the processor. The computer software components comprise an instruction receiving component for receiving instructions for displaying a custom form. A device is scanned with an interrogator component. A runtime component executes at least a portion of the instructions based on the characteristics. The custom form is displayed by a display component based on the at least a portion of the instructions that are executed by the runtime component.

In another embodiment, one or more computer storage media storing computer-executable instructions that, when executed by one or more computing devices, cause the one or more computing devices to perform a method for designing a platform-specific form. The method comprises receiving a base form. A selection of a particular platform is received and a platform-specific view of the base form is presented. Custom design form parameters are received for the particular platform. The base form for the particular platform is modified and a platform-specific view of the custom form is presented.

In another embodiment of the present invention, a graphical user interface (GUI) is stored on one or more computer-readable media and executable by a computing device. The GUI comprises a first display area configured for displaying a view of a base form. The GUI further comprises a second display area configured for receiving a selection of a particular platform. The GUI further comprises a third display area configured for receiving a modification of a characteristic of the base form. The GUI further comprises a fourth display area configured for displaying the altered view corresponding with the modification. The GUI further comprises a fifth display area configured for saving the altered view as a custom form for the particular platform.

In yet another embodiment, a computer system for designing a platform-specific form on a device comprises a processor coupled to a computer storage medium, the computer storage medium having stored thereon a plurality of computer software components executable by the processor. The computer software components comprise a base form design component for designing a base form. A platform is selected with a platform selection component. A platform-specific view of the base form is presented with a platform-specific view component. Parameters of the base form are modified with a custom design form component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Embodiments of the present invention are directed to methods, computer systems and computer readable media for designing platform-specific forms. Operators are able to tailor modifications to a base form to each desired platform to enhance the performance and appearance associated with the form, and without breaking the parent-child relationship between the base form and the custom form for any non-modified characteristics of the base form. Embodiments of the present invention are directed to methods, computer systems and computer readable media for displaying device-specific forms. An interrogator is executed at runtime to specify a set of instructions that will be executed, further enhancing the performance and appearance associated with the form and the particular device displaying the form. In various embodiments of the present invention, user interfaces provide the designer visual representations of the forms as they appear on selected platforms and/or devices. Accordingly, an efficient multi-platform design tool not limited by the "least common denominator" and able to provide a customized look and feel for applications for each platform and/or device is provided.

Figure 1:
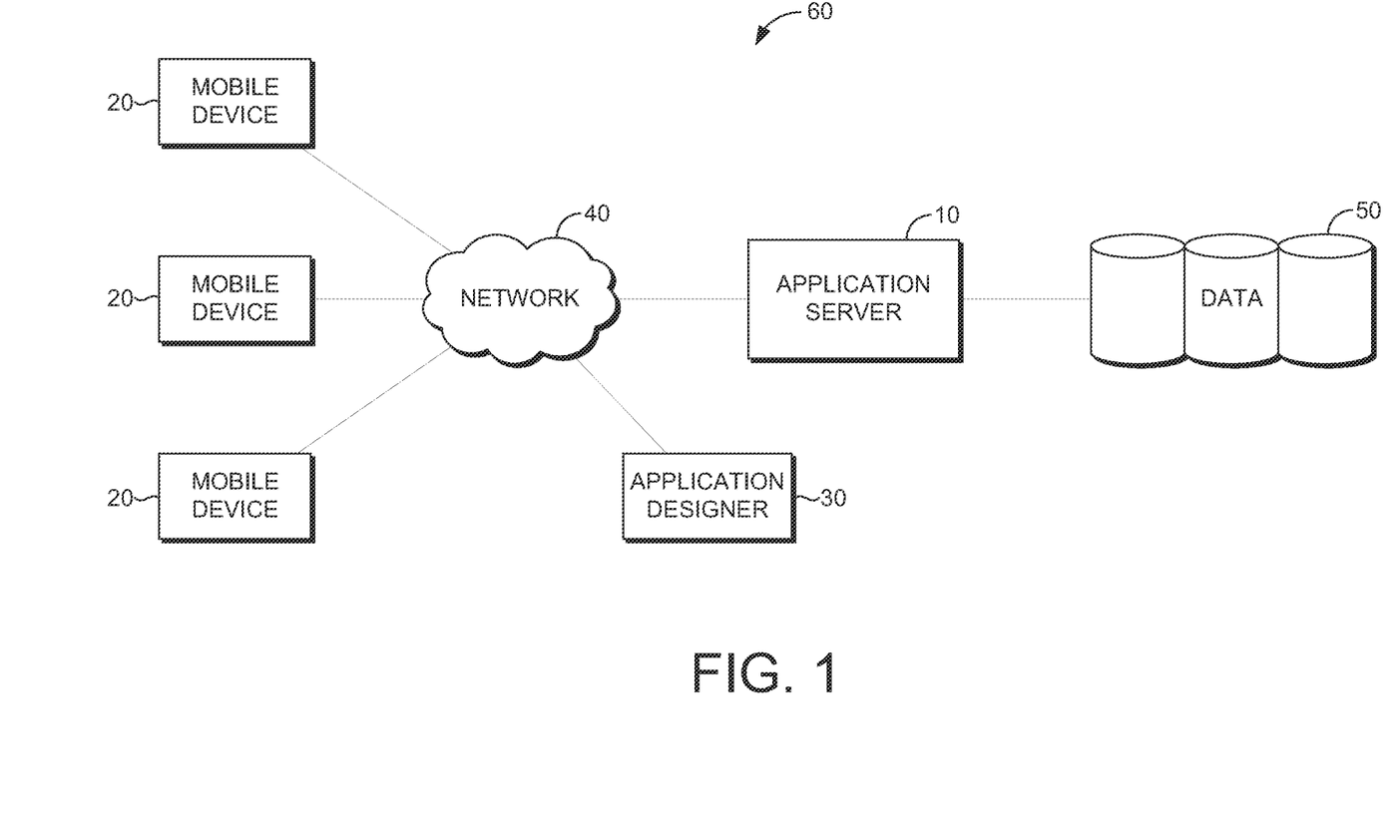
FIGS. 1-3 is an exemplary system architecture suitable to implement embodiments of the present invention.

Having briefly described embodiments of the present invention, an exemplary operating environment suitable for use in implementing embodiments of the present invention is described below. Referring to FIG. 1 an exemplary computing environment with which embodiments of the present invention may be implemented is illustrated and designated generally as reference numeral 60. The computing environment 60 is merely an example of one suitable computing environment and is not intended to suggest any limitation as to the scope of use or functionality of the invention. Neither should the computing environment 60 be interpreted as having any dependency or requirement relating to any single component or combination of components illustrated therein.

The present invention might be operational with numerous other general purpose or special purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules include routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 60 includes a general purpose computing device in the form of an application server 10. Exemplary components of the application server 10 include a processing unit, internal system memory, and a suitable system bus for coupling various system components, including database cluster 50, with the application server 10. The system bus might be any of several types of bus structures, including a memory bus or memory controller, a peripheral bus, and a local bus, using any of a variety of bus architectures. Exemplary architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The application server 10 typically includes therein, or has access to, a variety of computer-readable media, for instance, database cluster 50. Computer-readable media can be any available media that might be accessed by application server 10, and includes volatile and nonvolatile media, as well as, removable and nonremovable media. Computer-readable media might include computer storage media. Computer storage media includes volatile and nonvolatile media, as well as, removable and nonremovable media implemented in any method or technology for storage of information, such as computer-readable instructions, data structures, program modules, or other data. In this regard, computer storage media might include RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the application server 10. Combinations of any of the above also may be included within the scope of computer-readable media.

The computer storage media discussed above and illustrated in FIG. 1, including database cluster 50, provide storage of computer-executable instructions, data structures, program modules, and other data for the application server 10.

The application server 10 might operate in a computer network 40 using logical connections to one or more remote mobile devices 20. The remote mobile devices 20 might be personal computers, servers, routers, network PCs, peer devices, other common network nodes, or the like and might include some or all of the elements described above in relation to the application server 10. The devices can be personal digital assistants or other similar devices.

Exemplary computer networks 40 include local area networks (LANs) and/or wide area networks (WANs). Such networking environments are commonplace in offices, enterprise-wide computer networks, intranets, and the Internet. When utilized in a WAN networking environment, the application server 10 might include a modem or other means for establishing communications over the WAN, such as the Internet. In a networked environment, program modules or portions thereof might be stored in association with the application server 10, the database cluster 50, or any of the remote mobile devices 20. For example, various application programs may reside on the memory associated with any one or more of the remote mobile devices 20. It will be appreciated by those of ordinary skill in the art that the network connections shown are exemplary and other means of establishing a communications link between the computers (e.g., application server 10 and application designer 30 and remote mobile devices 20) might be utilized.

In operation, an operator might enter commands and information into the one or more remote mobile devices 20 or the application designer 30 or convey the commands and information to the application server 10 through input devices, such as a keyboard, a pointing device (commonly referred to as a mouse), a trackball, or a touch pad. In embodiments, such commands and information are communicated to the application server 10 and applications stored in the database cluster 50 are communicated or executed on one or more of the remote mobile devices 20. In other embodiments, such commands and information are communicated to the application server 10 and at least portions of applications stored in the database cluster 50 are modified and displayed on the application designer 30. Other input devices include microphones, satellite dishes, scanners, or the like. Commands and information might also be sent directly from a remote mobile device 20 or the application designer 30 to the application server 10. In one embodiment, the application server 10 and the application designer 30 reside on the same physical computing device.

Although many other internal components of the application server 10, application designer 30 and the remote mobile devices 20 are not shown, those of ordinary skill in the art will appreciate that such components and their interconnection are well known. Accordingly, additional details concerning the internal construction of the application server 10, application designer 30 and the remote mobile devices 20 are not further disclosed herein.

Figure 2:
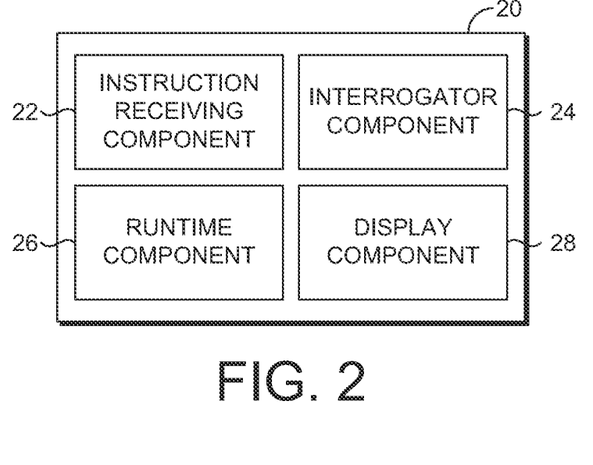

Referring now to FIG. 2, a block diagram is provided illustrating an exemplary remote mobile device 20 in accordance with embodiments of the present invention. As shown in FIG. 2, the remote mobile device may include an instruction receiving component 22, an interrogator component 24, a runtime component 26, and a display component 28. In various embodiments, the remote mobile device 20 may also include a device information component (not shown) and an alternate display component (not shown). In various embodiments, at least a portion of the components do not physically reside in the remote mobile device 20.

The instruction receiving component 22 receives instructions for displaying a custom form. In one embodiment, the instructions are communicated by the application server. In another embodiment, the instructions are communicated by another remote mobile device 20. The instructions include programming code for, in part, running an application, such as for displaying a custom form, on the remote mobile device 20. An interrogator component 24 scans the remote mobile device for characteristics of the mobile device. In one embodiment, the interrogator component 24 utilizes a portion of the instructions to scan the remote mobile device. In various embodiments, the characteristics include hardware characteristics associated with the remote mobile device 20 such as the presence of a camera or video recorder. In various embodiments, the characteristics include platform characteristics associated with the remote mobile device 20 such as the operating system and operating system version. In various embodiments, the characteristics include software characteristics such as the presence and version of specific software components. A runtime component 26 determines which of the instructions received by the instruction receiving component 24 to execute based on the characteristics identified by the interrogator component 24. The runtime component 26 then executes at least a portion of the instructions based on this determination. A display component 28 displays the custom form based on the portion of the instructions received by the instruction receiving component 22 that are executed by the runtime component.

In one embodiment, a device information component (not shown) communicates device information to another mobile device or the application server. Based on the device information, the appropriate set of instructions is communicated to the instruction receiving component. In one embodiment, the device information includes a device type, a device platform, or a combination thereof.

In another embodiment, an alternate display component displays an alternate portion of the custom form based on an inconsistency between the portion of instructions that are executed by the runtime component and the hardware characteristics, the software characteristics, the device information, or a combination thereof. An inconsistency may exist if, for example, the interrogator component determines that the mobile device includes a camera but when the runtime component executes the portion of instructions directed to a camera function, the camera is disabled. Rather than causing the application or form to fail, the alternate display component displays an alternate portion of the custom form that provides another mode for receiving similar information but does not require the camera function. In one embodiment, the interrogator component identifies changes in the characteristics such as described in this example and communicates with the alternate display component as needed.

Figure 3:
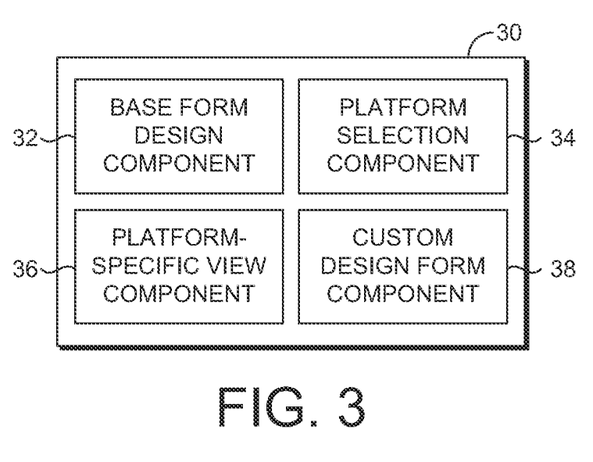

Referring now to FIG. 3, a block diagram is provided illustrating an exemplary application designer 30 in accordance with embodiments of the present invention. As shown in FIG. 3, the application designer may include a base form design component 32, a platform selection component 34, a platform-specific view component 36, and a custom design form component 38. In various embodiments, the application designer 30 may also include a custom design form view component (not shown) and a compare component (not shown). In various embodiments, at least a portion of the components reside in the application server 10, shown in FIG. 1.

The base form design component 32 receives a design for a base form. The base form is initially designed to provide a base form that is usable by any device or platform. A platform selection component 34 receives a selection of a platform. A platform-specific view component presents a platform-specific view of the base form. The platform-specific view provides an operator (i.e., a programmer, application designer, customer user, or application developer) a visual of what the base form would look like on a specific platform or device. In particular, the operator can determine whether it is necessary to modify the base form to conform to standards associated with the specific platform or device. A custom design form component 38 provides the functionality necessary to achieve this by receiving modifications to parameters (i.e., characteristics) of the base form.

In one embodiment, a custom design form view component presents a view of the base form with modified parameters (e.g., the custom form). This view allows the programmer to determine if the desired results were achieved and the custom form conforms to requirements for the specific platform or device.

In one embodiment, a compare component presents more than one view. For instance, an operator may wish to compare views of more than one specific platform in a side-by-side fashion. It may also be desirable to compare a before (e.g., base form) and after (e.g., custom) view in a side-by-side fashion.

Figure 4:
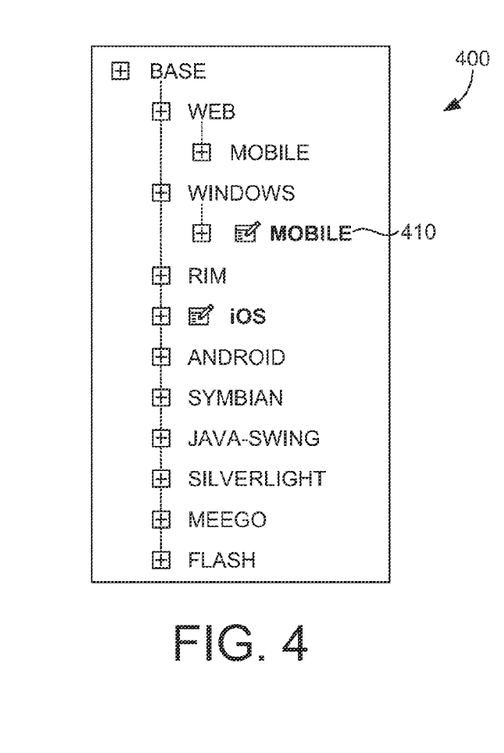
FIGS. 4-10 are screenshots of graphical user interfaces in accordance with embodiments of the present invention.

Referring now to FIG. 4, an illustrative graphical user interface is shown for receiving a selection of a particular platform. An operator begins designing the application or form with a generic view of the user interface. This base form does not represent any particular platform's style and is generic or "wire-frame" in nature. Once the base form is defined, the application developer creates a platform-specific view, or a custom form. A custom form 410 is added to the hierarchy for Windows Mobile devices. The base form is utilized as a starting point for the custom form and modifications to the base form are saved into the hierarchy. Ad-hoc creation of new device viewing profiles is also supported in embodiments of the invention. Device profiles can be created for a number of devices running any number of platforms such as Windows®, RIM, iOS, Android™, Symbian, Swing, Silverlight, MeeGo, or Adobe® Flash®.

Figure 5:
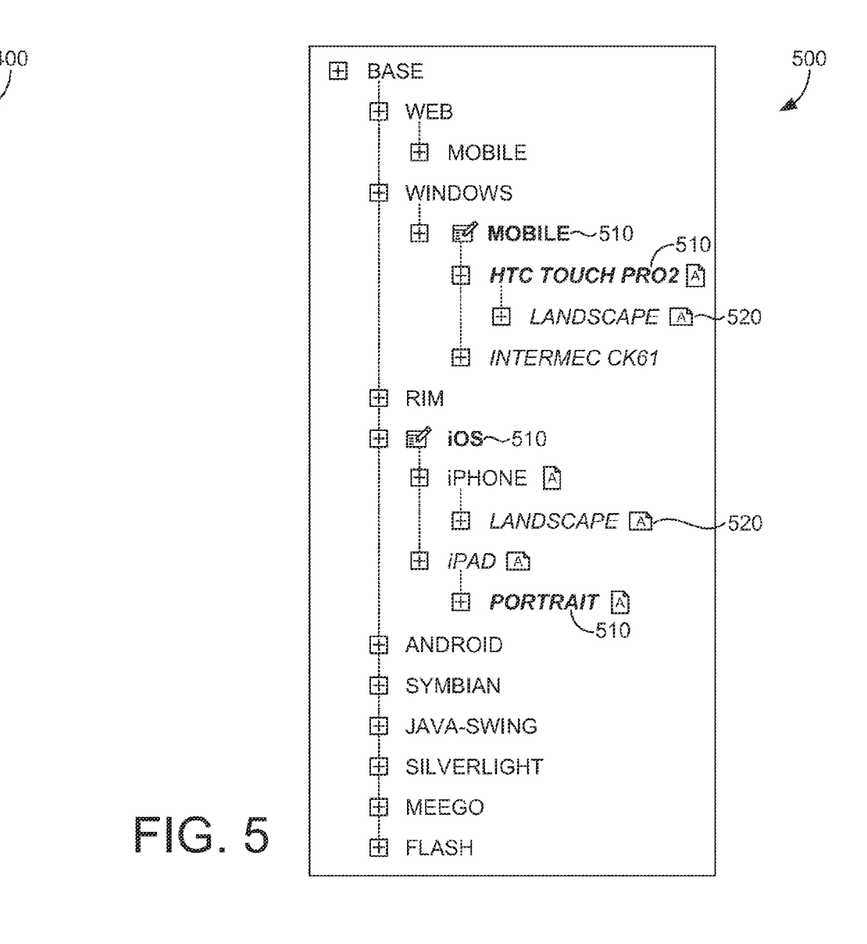

Referring to FIG. 5, an illustrative graphical user interface is shown for receiving a selection of a particular platform. As is apparent, the list of possible viewing scenarios increases as new platforms or profiles are added and new custom forms are created and the view tree grows. In one embodiment, the list can be filtered to eliminate platform choices that are rarely or never used. When an operator desires to set up a new profile in the view tree, the operator simply selects the system-defined platform the new profile is a child of, and provides information such as profile name, screen dimensions, screen density. In addition, the operator can set a flag to indicate whether the device supports orientation detection and switching (i.e., portrait, landscape). The new custom form can then be created by modifying the base form as described herein. An alternate orientation 520 will be added if the orientation support flag is set.

Once a platform is selected, the editor displays the form as it would appear on the selected platform. In particular, the form is displayed to match the platform's style, control appearance, size limitations, or other characteristics that may influence the look and feel of the form. If the base form as displayed does not meet the expectations of the operator or the standards of the particular platform or device, then modifications may be made to override characteristics or otherwise modify the look and feel of the form. In embodiments, these modifications may include the addition or deletion of characteristics of the form. Customized platform-specific views 510 appear in bold.

Figure 6:
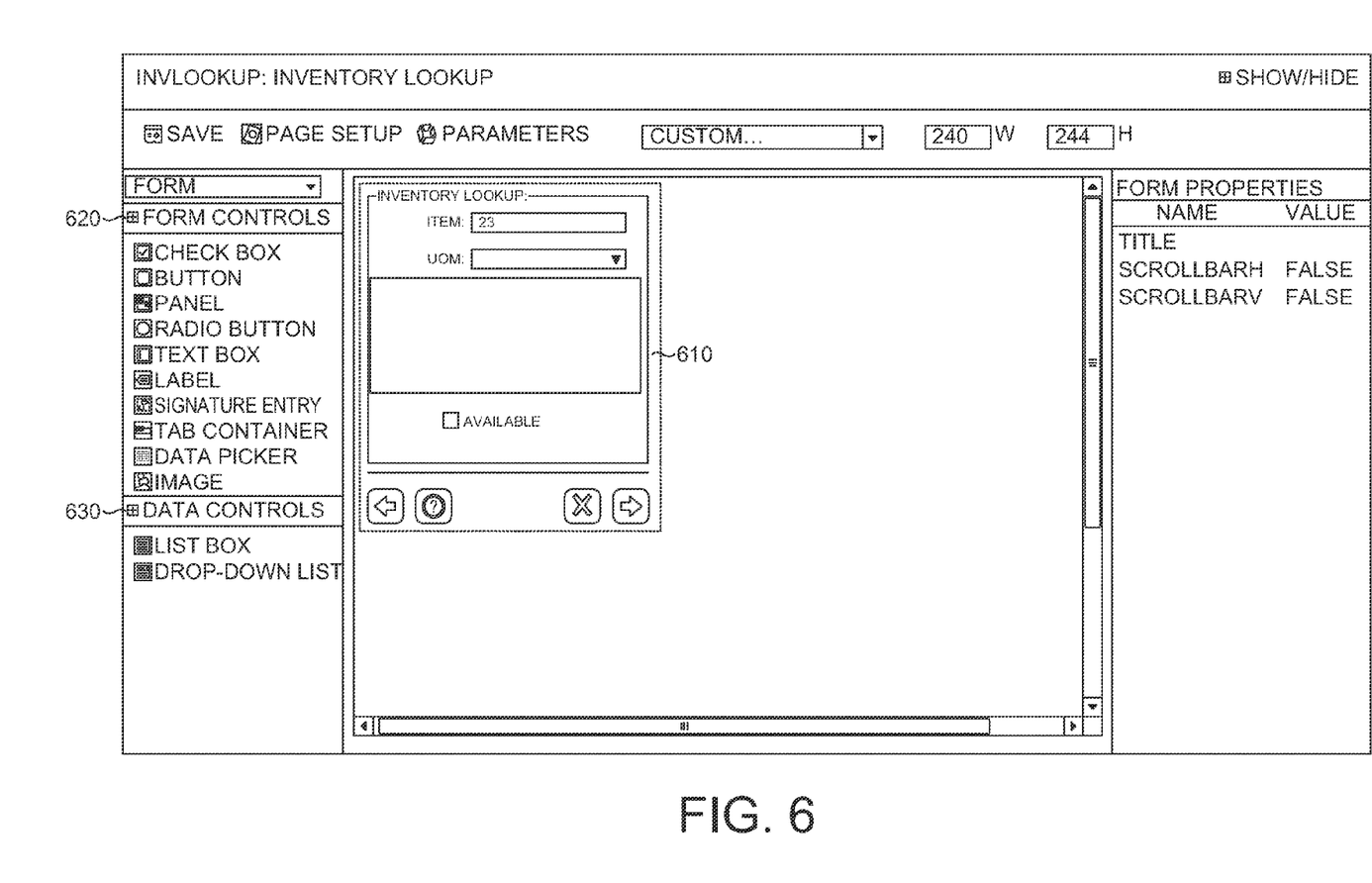
Figure 7:
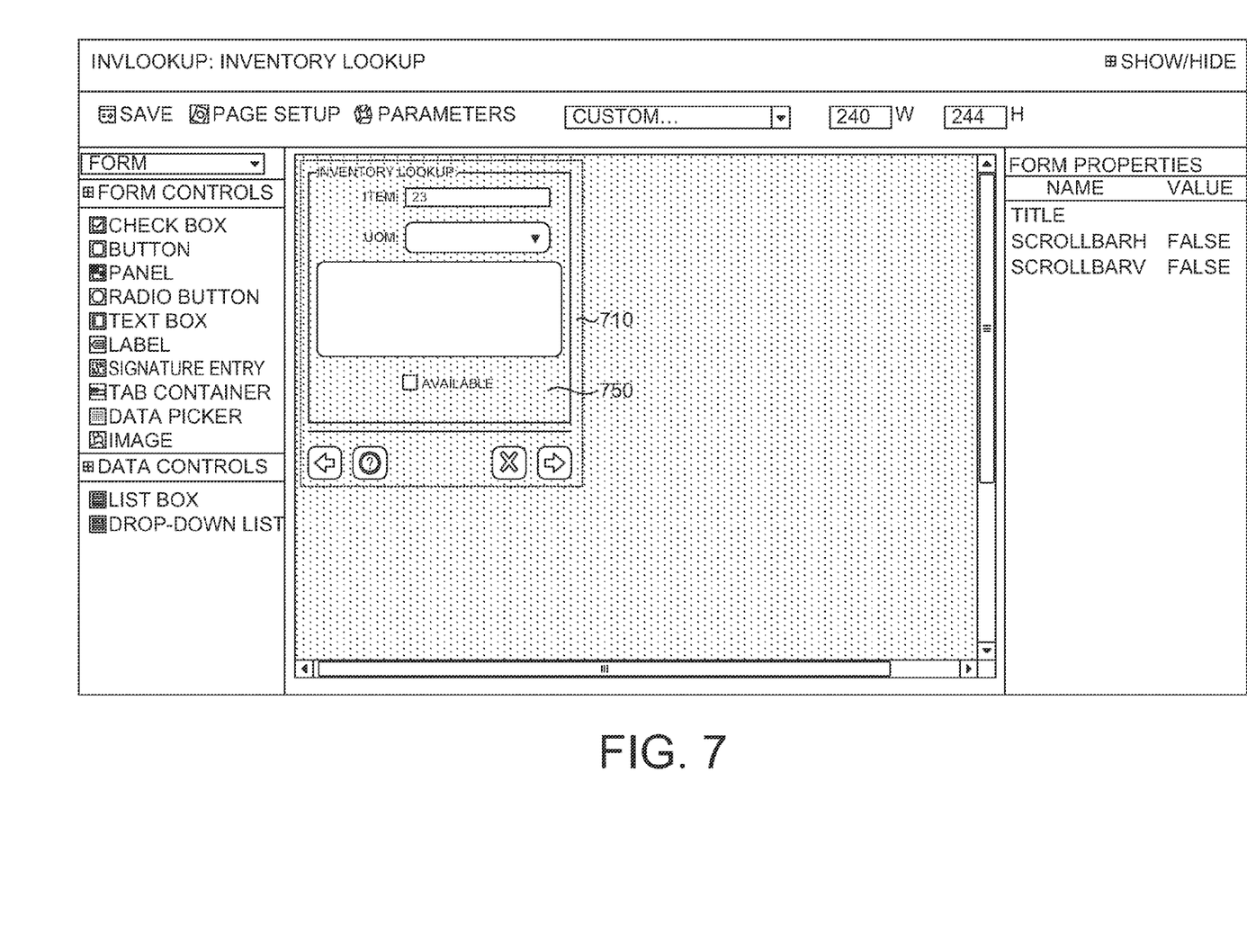
Figure 8:
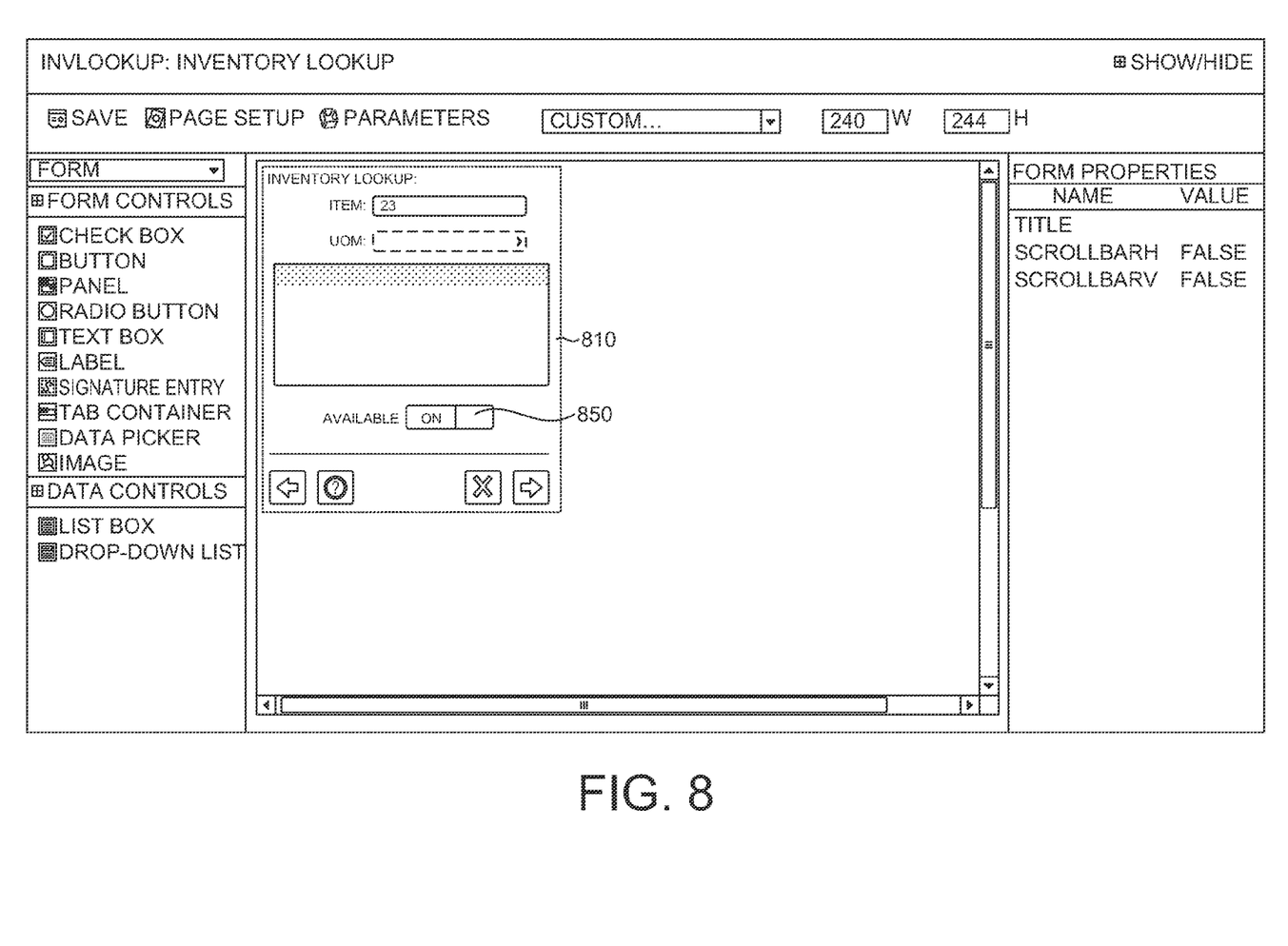
Figure 9:
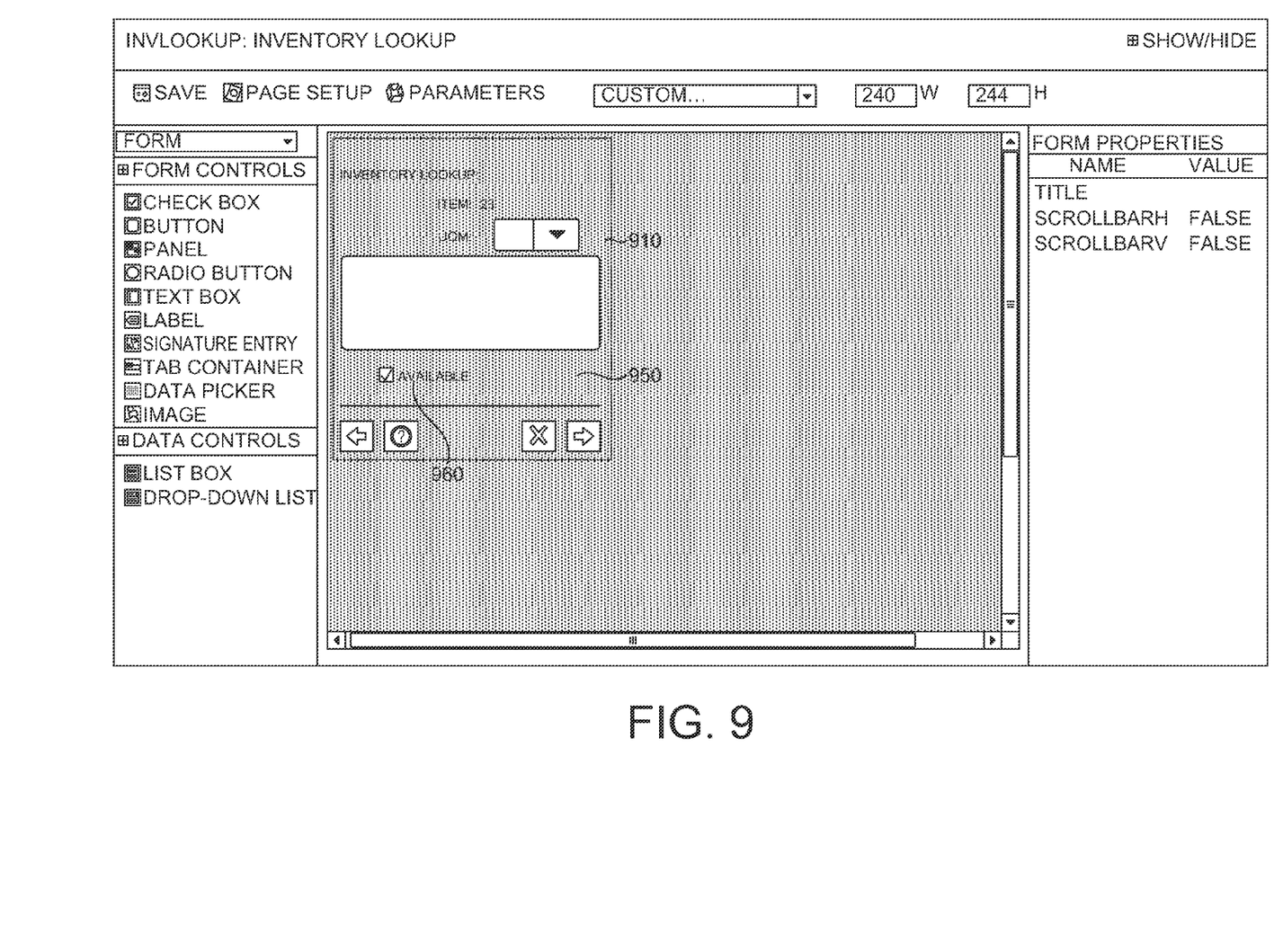

Referring now to FIGS. 6-9, illustrative graphical user interfaces are shown to depict a base form (FIG. 6) and various platform specific views (FIGS. 7-9). In particular, FIG. 6 illustrates an example of what a base form may look like. Form Controls 620 and Data Controls 630 are utilized by the programmer to design the appearance of the base form 610. Once the base form is designed, the programmer can select another node from the view tree and the base from is presented as it would appear on the selected platform or device. For example, FIG. 7 illustrates a Blackberry® view 710 of the base form. The primary difference in this example is in the background. Similarly, FIG. 8 illustrates an Apple® iOS view 810 of the base form. In this particular example, the appearance of the AVAILABLE control 850 is slightly different. The Android® view 910 of the base form, illustrated in FIG. 9, also identifies a different appearance in the background 950 and in the AVAILABLE control 960. As is apparent, these views of the base from as they appear on various platforms and devices are very useful to a programmer to assist the programmer in maintaining consistency and proper formatting and appearance that may be desired or required by the users or makers of a particular device or platform.

Figure 10:
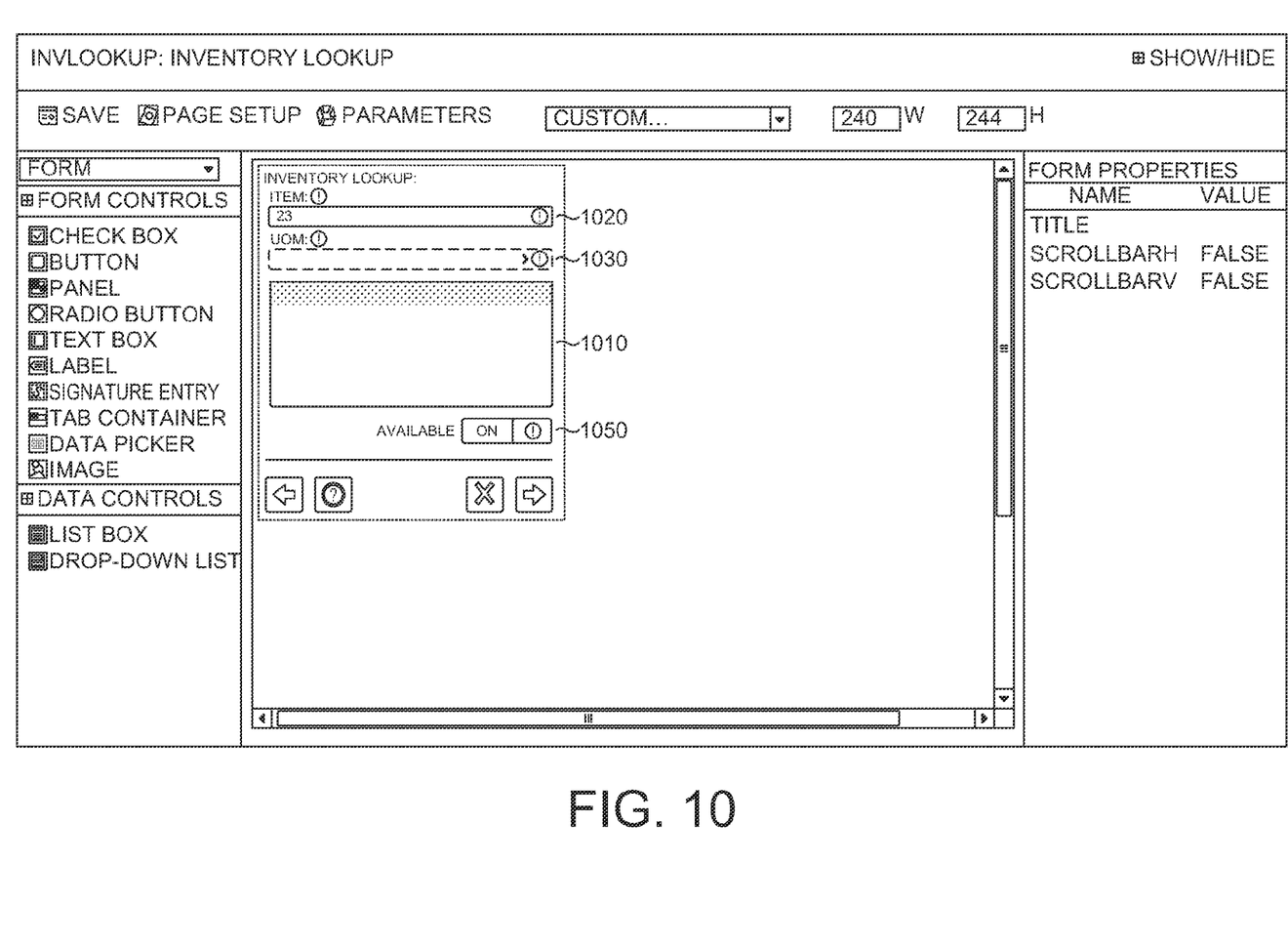

Referring now to FIG. 10, an illustrative graphical user interface demonstrates an Apple® iOS view 1010 of the base form with control property overrides. Simply put, the custom view 1010 represents the changes or modifications made to the base form by the programmer to meet the desires or requirements described above. For example, the ITEM control 1020 and the UOM control 1030 have increased in size horizontally. The AVAILABLE control 1050 has been modified slightly in appearance and moved to a justified position on the right-hand side of the form.

As is apparent, many other controls and properties not described in the example above or herein are easily modified by the present invention. Some of these controls include buttons, text boxes, drop-down boxes, date pickers, list boxes, labels, panels, check boxes, radio buttons, tab containers, signature boxes, images, and tabs. Properties associated with these controls include position (i.e., left, top), size (i.e., width, height), enabled, visible, font type, font size, font style, foreground and background colors, images, password, date ranges, data source, anchors, images, image placement.

Optional code branching is supported by the present invention and drives the interrogator. For example, the forms created by the application designer include code to check the platform of the device running the form. In addition, system variables are created for each device capability that may or may not be present on a particular platform or device. Values for these system variables are returned indicating whether the functionality associated with that particular variable is supported or not. This allows the operator to write an application or form that can run on multiple platforms or devices with minor functionality differences based on device capabilities. Some of these capabilities may include signature capture, forms, database, repository, file system, image capture, custom application programming interface (API), shell commands, radio frequency identification (RFID), voice recognition, and global positioning system (GPS).

Figure 11:
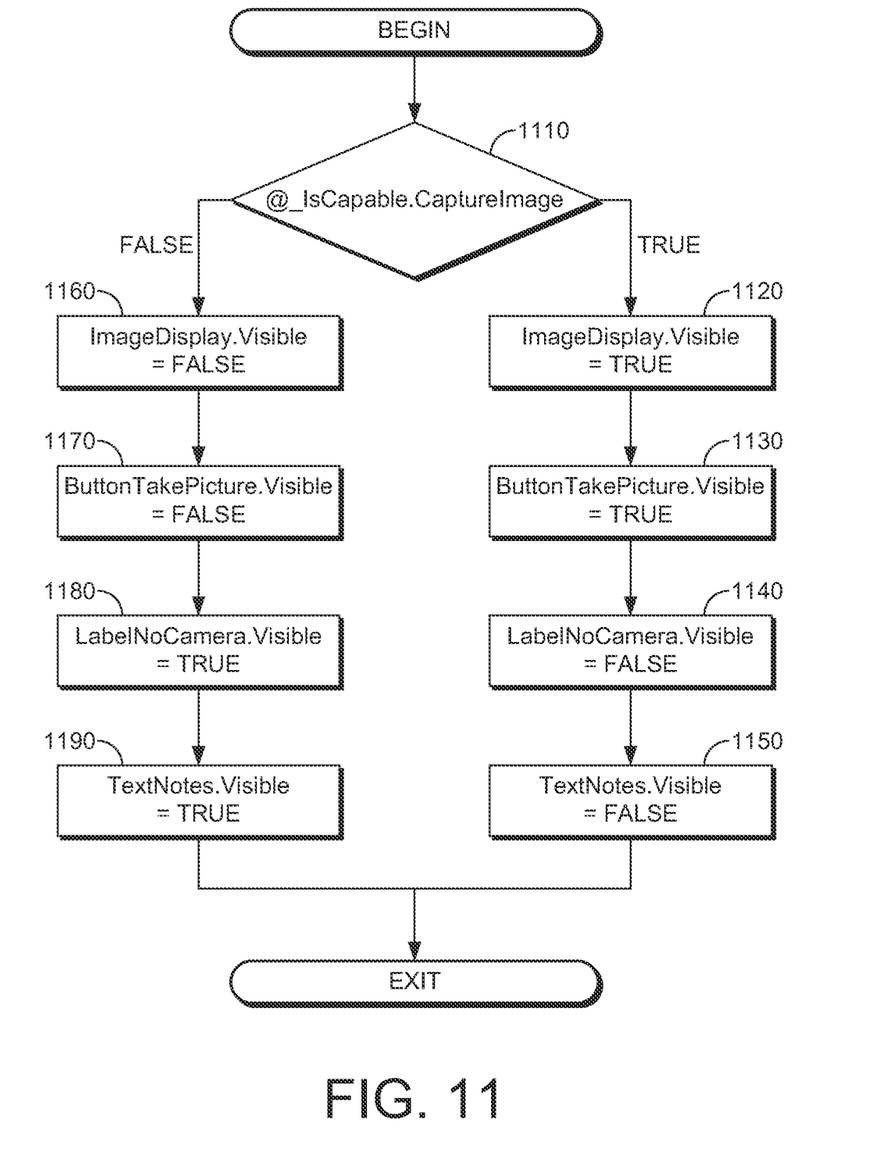
FIG. 11 is a flow diagram of a method in accordance with an embodiment of the present invention.
Figure 12:
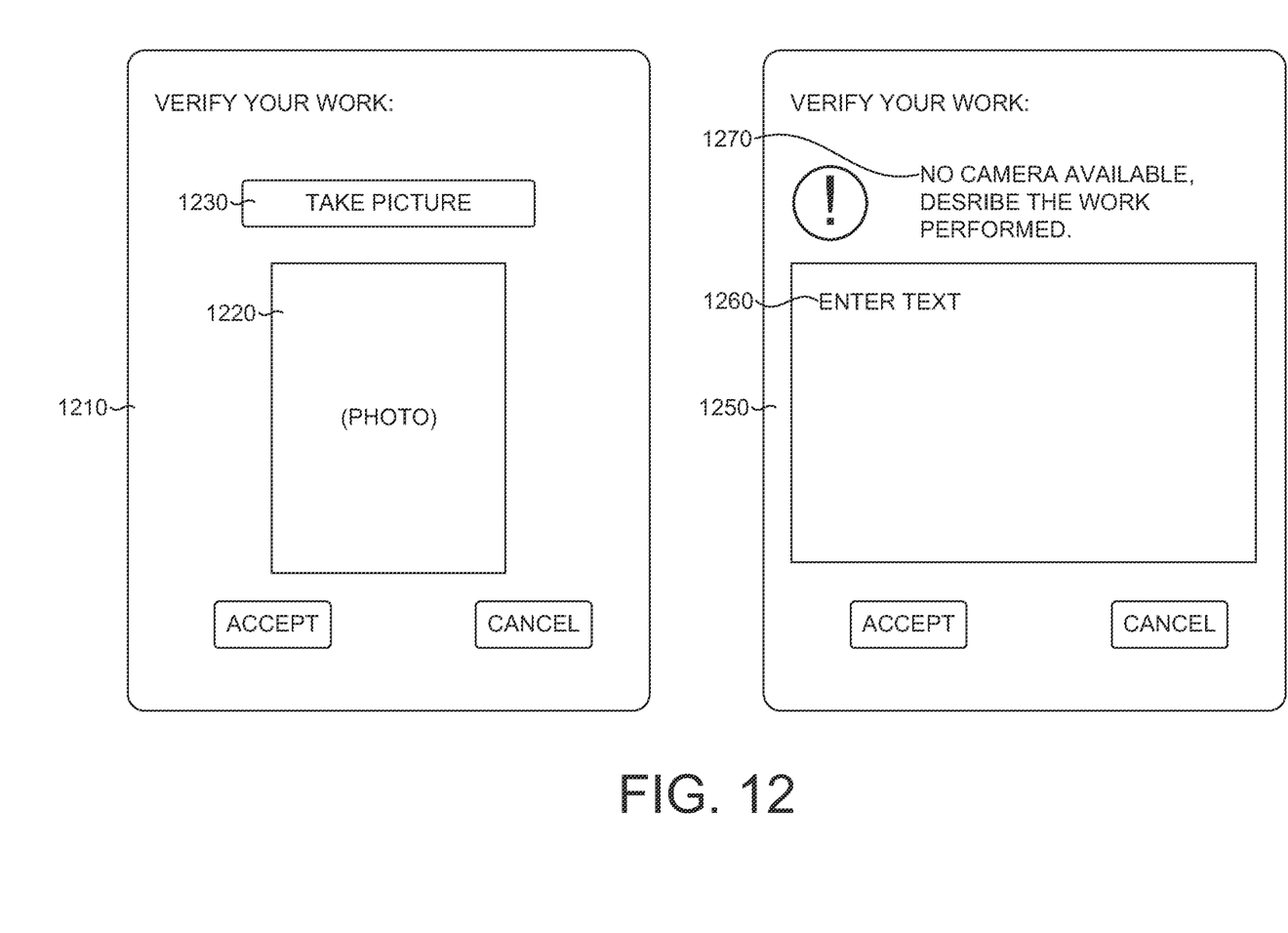
FIG. 12 is a screenshot of a graphical user interface in accordance with an embodiment of the present invention.

Referring now to FIGS. 11 and 12, a flow diagram and an illustrative graphical user interface provide an example of the logic flow for verifying that a camera is available that the appropriate controls are visible and the resulting user interface. For example, at step 1110, a value for a system variable determines whether the device is capable of capturing images. If that value is true, then at step 1120, an image display 1220 is displayed. Similarly, at step 1130, a button 1230 appears for taking a picture. Because a camera is available, at steps 1140 and 1150, the text notes and the no camera label are hidden.

If, however, at step 1110, the value for the system variable is false, then the device does not have a camera available. At steps 1160 and 1170, values for the image display and the button are false. In this instance, at step 1180, the value for the no camera label is true and the message "No Camera Available, Describe the Work Performed" appears in the no camera label section 1270 in place of the button 1230. At step 1190, the value for the text notes is true and the text box 1260 appears in place of the image display 1220.

Figure 13:
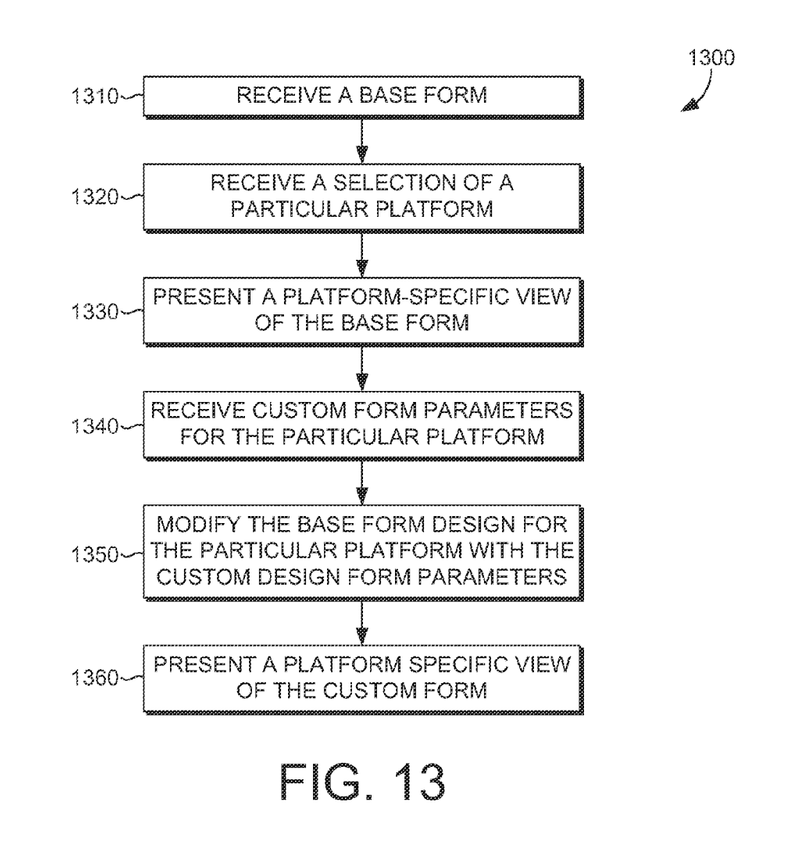
FIGS. 13-15 are flow diagrams of methods in accordance with an embodiment of the present invention.

Turning now to FIG. 13, an illustrative flow diagram 1300 is shown of a method for designing and displaying a device- and/or platform-specific form. Initially, a base form is received at step 1310. At step 1320, a selection of a particular platform is received. A platform-specific view of the base form is received at step 1330. In one embodiment, a selection of a different platform is received and the different platform-specific view is presented. In another embodiment, the particular platform and the different platform are presented side-by-side. At step 1340, custom form parameters are received for the particular platform. The base form for the particular platform is modified with the custom design form parameters at step 1350. In one embodiment, modifying the base form comprises editing properties associated with the base form. At step 1360, a platform-specific view of the custom form is presented.

In one embodiment, the custom form and the base form are presented side-by-side. This view allows the operator to determine if the goals of the modifications to the base form were achieved. In one embodiment, the custom form is saved. In one embodiment, after the custom form is saved, an operator can select a different platform for the custom form and is presented with a different platform-specific view of the custom form.

In one embodiment, the modified features that comprise the custom form are saved in a separate branch from the base form. In one embodiment, modifications to the base form that have not been modified in a particular custom form propagate to the particular custom form. In one embodiment, modifications to the base form that have been modified in a particular custom form do no propagate to the particular custom form. These embodiments each allow modifications to the parent, or base form, to propagate only to the child nodes, custom forms, where appropriate.

Figure 14:
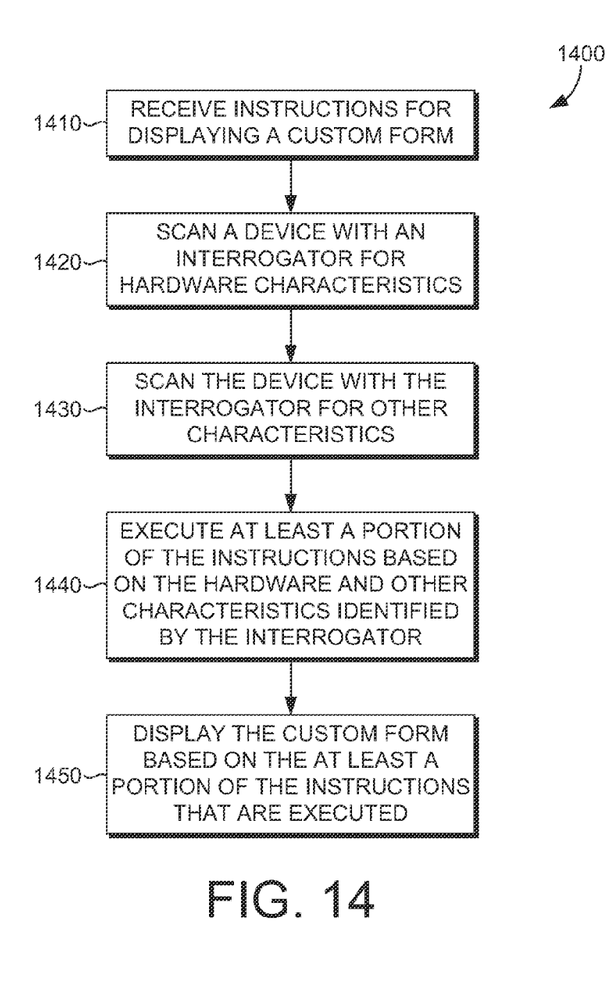

Turning now to FIG. 14, an illustrative flow diagram 1400 is shown of a method for displaying a device—and/or platform-specific form on a device. Instructions for displaying a custom form are received at step 1410. At step 1420, a device is scanned with an interrogator for hardware characteristics. In one embodiment, hardware characteristics include capabilities of the device. In one embodiment, the instructions for displaying a custom form include code comprising the interrogator. The device is also scanned with the interrogator for other characteristics at step 1430. In one embodiment, other characteristics include a platform associated with the device. In one embodiment, other characteristics include firmware associated with the device. At least a portion of the instructions are executed, at step 1440, based on the hardware and other characteristics identified by the interrogator. The custom form is displayed based on the at least a portion of the instructions that are executed at step 1450.

In one embodiment, controls are set as visible based on the hardware characteristics, other characteristics, or a combination thereof. In one embodiment, controls are set as invisible based on the hardware characteristics, other characteristics, or a combination thereof. In this respect, the logic that determines the controls associated with the form may be embedded in the code itself.

Figure 15:
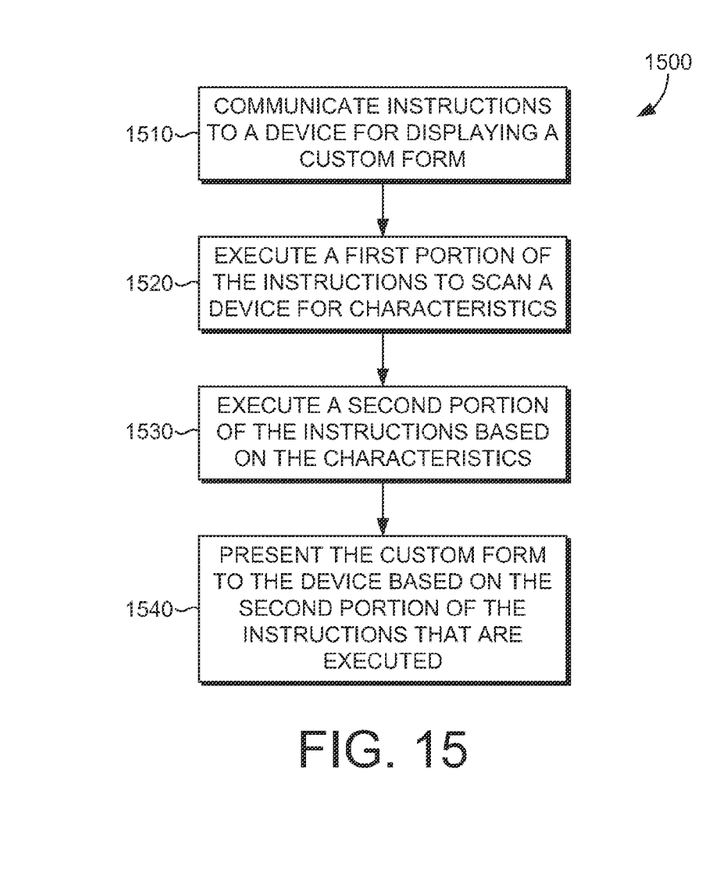

Turning now to FIG. 15, an illustrative flow diagram 1500 is shown of a method for displaying a device- and/or platform-specific form. At step 1510, instructions are communicated to a device for displaying a custom form. A first portion of the instructions are executed, at step 1520, to scan a device for characteristics. At step 1530, a second portion of the instructions are executed based on the characteristics. The custom form is presented to the device, at step 1540, based on the second portion of the instructions that are executed.

In one embodiment, device information is also received. The device information may include a device type, a device platform, or a combination thereof. In one embodiment, each portion of the instructions that are executed is dependent upon the device information. In one embodiment, the instructions communicated to the device are dependent upon the device information.

In one embodiment, an alternate portion of the custom form is presented based on an inconsistency between the second portion of the instructions that are executed and the hardware characteristics, the other characteristics, the device information, or a combination thereof.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer storage media storing computer-executable instructions that, when executed by one or more computing devices, cause the one or more computing devices to perform a method for designing a platform-specific form, the method comprising:
   receiving a base form for a mobile device application, wherein the base form is usable by a plurality of platforms and an appearance of the base form varies among the plurality of platforms;
   presenting the plurality of platforms;
   receiving a user selection of a particular platform from the plurality of platforms;
   presenting a platform-specific view of the base form that corresponds to a presentation of the base form on the particular platform;
   receiving a modification to the base form to provide a custom form for the particular platform;
   presenting a platform-specific view of the custom form that corresponds to a presentation of the custom form on the particular platform, wherein the platform-specific view of the custom form is presented side by side with the platform-specific view of the base form;
   receiving a modification to a parameter of the base form; and
   determining whether a corresponding parameter of the custom form has been previously modified, the corresponding parameter of the custom form corresponding to the modified parameter of the base form, and:
      when the corresponding parameter of the custom form has not been previously modified, applying the received modification to the corresponding parameter of the custom form, and
      when the corresponding parameter of the custom form has been previously modified, determining not to apply the received modification to the corresponding parameter of the custom form.

2. The media of claim 1, further comprising receiving a user selection of a different platform from the plurality of platforms and presenting a different platform-specific view of the base form that corresponds to a presentation of the base form on the different platform.

3. The media of claim 2, further comprising presenting the particular platform and the different platform side by side.

4. The media of claim 1, further comprising saving the custom form.

5. The media of claim 4, wherein parameters for the custom form are saved in a branch that is separate from parameters for the base form.

6. The media of claim 4, further comprising receiving a user selection of a different platform from the plurality of platforms and presenting a different platform-specific view of the custom form.

7. A computer system for designing a platform-specific form, the computer system comprising a processor coupled to a computer storage medium, the computer storage medium having stored thereon a plurality of computer-executable instructions that, when executed by the processor, implement a method comprising:

receiving a design of a base form that is associated with a mobile device application, wherein the base form is usable by a plurality of platforms, wherein an appearance of the base form varies among the plurality of platforms;

receiving a user selection of a platform from the plurality of platforms;

presenting a platform-specific view of the base form that corresponds to a presentation of the base form on the selected platform;

receiving a customization of the base form to provide a custom form for the selected platform;

receiving a modification to a parameter of the base form; and determining whether a corresponding parameter of the custom form has been previously modified, the corresponding parameter of the custom form corresponding to the modified parameter of the base form, and:

when the corresponding parameter of the custom form has not been previously modified, applying the received modification to the corresponding parameter of the custom form, and when the corresponding parameter of the custom form has been previously modified, determining not to apply the received modification to the corresponding parameter of the custom form.

8. The system of claim 7, wherein the method further comprises presenting a view of the modified parameter.

9. The system of claim 7, wherein the method further comprises presenting more than one view.

10. The system of claim 9, wherein the more than one view includes the platform-specific view of the base form that corresponds to the presentation of the base form on the selected platform and a platform-specific view of the custom form that corresponds to a presentation of the custom form on the selected platform.

11. The system of claim 9, wherein the more than one view includes a platform-specific view of the custom form that corresponds to a presentation of the custom form on the selected platform and a platform-specific view of the custom form that corresponds to a presentation of the custom form on a second platform.

12. A method for designing a platform-specific form, the method comprising:

receiving a base form that is associated with a mobile device application, wherein the base form is usable by a plurality of platforms and an appearance of the base form varies among the plurality of platforms;

receiving an indication of a first platform of the plurality of platforms;

presenting a platform-specific view of the base form that corresponds to a presentation of the base form on the first platform;

receiving a first customization of the base form to provide a first custom form for the first platform;

presenting a platform-specific view of the first custom form that corresponds to a presentation of the first custom form on the first platform;

receiving a modification to a parameter of the base form; and determining whether a corresponding parameter of the first custom form has been previously modified, the corresponding parameter of the first custom form corresponding to the modified parameter of the base form, and:

when the corresponding parameter of the first custom form has not been previously modified, applying the received modification to the corresponding parameter of the first custom form, and when the corresponding parameter of the first custom form has been previously modified, determining not to apply the received modification to the corresponding parameter of the first custom form.

13. The method of claim 12, wherein the platform-specific view of the base form that corresponds to the presentation of the base form on the first platform is presented side by side with the platform-specific view of the first custom form that corresponds to the presentation of the first custom form on the first platform.

14. The method of claim 12, further comprising:

receiving an indication of a second platform of the plurality of platforms, wherein the second platform is different from the first platform; and presenting a platform-specific view of the base form that corresponds to a presentation of the base form on the second platform.

15. The method of claim 14, wherein the platform-specific view of the base form that corresponds to the presentation of the base form on the first platform is presented side by side with the platform-specific view of the base form that corresponds to the presentation of the base form on the second platform.

16. The method of claim 14, wherein the platform-specific view of the first custom form that corresponds to the presentation of the first custom form on the first platform is presented side by side with a platform-specific view of a second custom form that corresponds to a presentation of the second custom form on the second platform.

* * * * *